United States Patent Office 3,630,903
Patented Dec. 28, 1971

3,630,903
LUBRICANT CONTAINING POLYMERIC PRODUCTS OF ALKENYL SUCCINIC ANHYDRIDE AND A PIPERIDINE DERIVATIVE
Walter W. Hellmuth, Beacon, N.Y., assignor to Texaco Inc., New York, N.Y.
No Drawing. Filed Aug. 7, 1969, Ser. No. 848,323
Int. Cl. C10m 1/20, 1/32
U.S. Cl. 252—51.5 A          14 Claims

ABSTRACT OF THE DISCLOSURE

A lubricating composition containing as a dispersant between about 0.1 and 80 wt. percent of a polymeric alkenyl succinic anhydride-piperidine derivative characterized the formula:

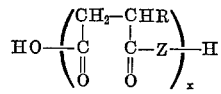

where $x$ is an average integer of from 2 to 100 and Z is a member selected from the group consisting of

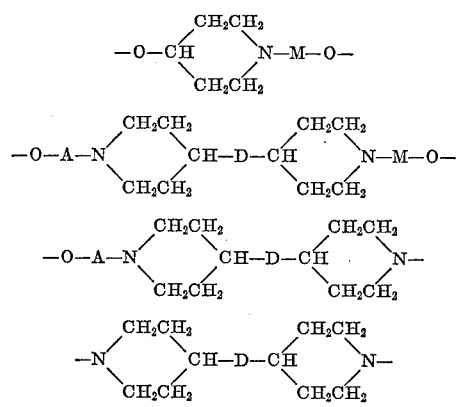

where A, M and D are divalent saturated aliphatic hydrocarbons of from 2 to 10 carbons, and R is a monovalent alkenyl hydrocarbon radical of from 30 to 200 carbons.

BACKGROUND OF INVENTION

The field of art to which this invention pertains are fluid compositions designed for use between two relatively moving surfaces in contact therewith or reducing friction therebetween containing a polymeric additive which also contains oxygen in addition to carbon, hydrogen and nitrogen, asid additive functioning as a dispersant.

The prior art as represented by U.S. 3,184,474 teaches as a sludge dispersant for lubricating oil a reaction product of an alkenyl succinic acid or anhydride with a polyamine and polyhydric material. The prior art product is prepared by a two-step procedure in which the polyhydric material such as polyethylene glycol and a polyamine such as tetraethylenepentamine are sequentially reacted with the alkenyl succinic anhydride. The resultant product is a non-polymeric mixture of ester, amide and imide. The patent further discloses as a dispersant the alkenyl succinimides of polyalkylene polyamines such as tetraethylenepentamine. While these prior art dispersants perform satisfactorily, they do have the disadvantage, particularly the amide and imide forms of breaking down during storage to give off offensive ammonia odor. Further, although these additives are often satisfactory under lubricating conditions, a search is continuously underway for additives of improved dispersancy properties especially to meet the heavy demands placed on modern day lubricating oils in automotive engines, e.g., by anti-pollution devices.

In U.S. 3,424,684 analogous alkenyl succinic anhydride piperazine polymers are disclosed as dispersants and these materials were a decided improvement in the art in respect to improved dispersant properties as well as resisting the ammonia emission during engine operation. However, there is a continual search for additives of still further improved dispersant properties.

SUMMARY OF INVENTION

I have discovered a lubricating oil composition containing a polymeric alkenyl succinic anhydride-piperidine derivative dispersant characterized by the formula:

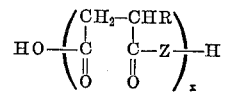

where $x$ is an average integer of from 2 to 100, R is a monovalent alkenyl hydrocarbon radical of from 30 to 200 carbons, and Z is a member selected from the group consisting of

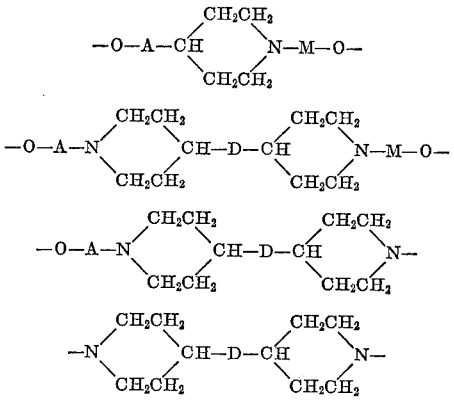

where A, M and D are divalent saturated aliphatic hydrocarbon of from 2 to 10 carbons.

The polymer compounds in the novel lubricant compositions of the invention imparts to the novel composition still further improved dispersant properties resulting in the improved prevention of the deposition of sludge on the engine parts of the automotive engine exposed to the lubricant composition. Further, the polymeric additive in the composition of the invention does not emit unpleasant ammonia odor upon standing or upon engine use.

DETAILED DESCRIPTION OF THE INVENTION

Specifically, the invention pertains to a hydrocarbon lubricating oil composition containing between about 0.1 and 80 wt. percent of a polymeric derivative of an alkenyl succinic anhydride of the formula:

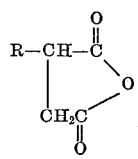

where R is as heretofore defined and a piperidine derivative selected from the group consisting of

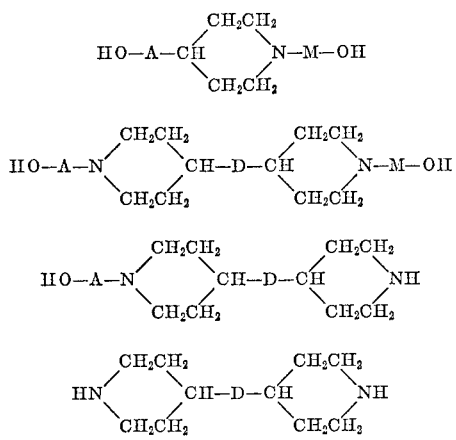

where A, M and D are as heretofore defined.

The polymeric additive of the composition is prepared by contacting under substantially anhydrous conditions alkenyl succinic anhydride as defined with piperidine derivative as defined desirably in the presence of a hydrocarbon lubricating oil at a temperature between about 80 and 220° C., and under conditions in which water is removed from the reaction mixture as formed. The contacting is conducted utilizing a reactant mole ratio of anhydride to di-functional piperidine of between about 0.8:1.0 and 1.0:0.8. In the reaction mixture the hydrocarbon lubricating oil component advantageously comprises between about 15 and 70 wt. percent.

Under preferred conditions, an azeotropic agent for water is also included to facilitate the continuous removal of water as formed. The azeotropic agent advantageously comprises between about 1 and 50 wt. percent of the reaction mixture. In any case, the continuous removal of formed water is accomplished by standard means with or without the means of azeotropic agents. For example, standard means include straight distillation at a reaction temperature utilizing a reduced pressure when necessary with or without a simultaneous stripping of the reaction mixture by passing an inert gas therethrough. An example of a particularly suitable inert gas is nitrogen.

The reaction is usually conducted for a period of time of between about 1 and 24 hours, preferably under conditions of agitation, whereupon the temperature is desirably further elevated to between about 160 and 220° C., to remove any residual water and volatile material such as azeotroping agents (if employed). There is left as residue the polymeric dispersant as heretofore defined or hydrocarbon lubricating oil concentrate thereof, if hydrocarbon lubricating oil is employed as the reaction medium.

The hydrocarbon lubricating oil concentrate residue normally contains between about 20 and 75 wt. percent of polymeric dispersant. Although the concentrate will function as an operative lubricant composition with dispersant properties, it is normally diluted with additional hydrocarbon lubricating oil to form a finished lubricating oil composition having a polymeric piperidine dispersant content between about 0.1 and 10 wt. percent.

Also in the finished lubricating oil, additional additives may be incorporated such as standard antioxidants, VI improvers, pour depressors and other dispersants, but particular additive combinations employed will, of course, be determined by the particular use designated for the finished composition.

In the manufacture of the polymeric piperidine dispersant there are several criticalities, one criticality is forming substantially anhydrous initial reaction mixtures and continuously removing water as formed. The reason for this is if the continued presence of water is permitted during the reaction, a non-polymeric piperidine monoester and diester of alkenyl succinic anhydride tends to predominate in the product, the monoesters and diesters being substantially less effective dispersants than their polymeric counterparts. The mono and diesters may be characterized by the following formula utilizing Z as the di-functional piperidine moiety:

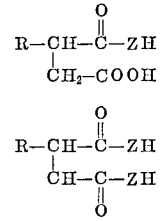

where Z and R are as heretofore defined.

Another procedural desirability is the forming of an initial reaction mixture where the number of acyl groups from alkenyl succinic anhydride and hydroxyl plus secondary amino groups from the piperidine moiety are adjusted so as to give a functional group ratio (acyl to hydroxyl+amino) between about 1:1 and 1:2. When the ratio is greater than about 1:1, products are formed which have substantially less dispersants in the compositions of the invention. Further, when the ratio is less than about 1:2, the aforementioned less desirable mono and diesters are formed.

Although not necessary, standard esterification-polymerization catalysts may be employed in the preparation of the polymeric derivatives in amounts of between about .0001 and 2 wt. percent of the reaction mixture. Specific examples of suitable esterification-polymerization catalysts contemplated herein are lead oxide, p-toluenesulfonic acid and sulfuric acid.

As heretofore stated, the alkenyl succinic anhydride reactant contemplated herein is of the formula:

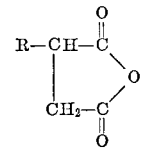

where R is an alkenyl hydrocarbon radical containing 30 to about 200 carbon atoms.

For the purpose of the present invention, alkenyl succinic acid of the formula:

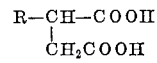

is deemed equivalent to the aforedefined alkenyl succinic anhydride.

The R radical in the above formula is normally derived from an alkene containing 2 to 5 carbons thus the alkenyl radical is derived from an olefinic hydrocarbon of from 30 to 200 carbons obtained by polymerizing by standard means an alkene containing 2 to 5 carbon atoms. The alkene precursors are exemplified by ethylene, propylene, 1-butene, 2-butene, isobutene and mixtures thereof. One of the preferred alkenyl groups is polyisobutylene of a molecular weight between about 1000 and 2000. It is to be noted the succinic anhydride is often prepared in the presence of lubricating oil and/or in an excess of said polymerized alkenes and these latter two materials usually remain associated with the anhydride product and in turn become part of the final compositions of the invention.

Specific examples of the piperidine reactants contemplated herein are as follows:

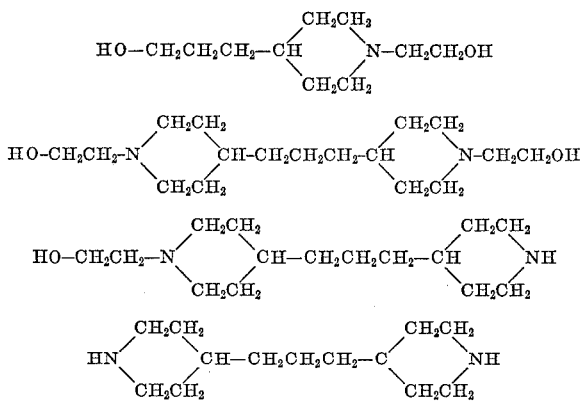

The hydrocarbon lubricating oils contemplated herein for the base oil, for the concentrate and finished compositions of the invention as well as the reaction medium (if used) in the preparation of the polymeric dispersant can be any of the hydrocarbon oils having a lubricating viscosity, e.g., between about 45 and 8000 SUS at 100° F. Specific examples are the paraffinic, naphthenic, aromatic base mineral lubricating oils derived from solvent refining crude petroleum products. In addition, synthetic hydrocarbon oils may be employed such as the liquid polyalkenes, e.g., polyisobutylene, polyisopropylene of a molecular weight between about 250 and 750 and alkylated benzene, e.g., dodecylbenzene. Preferred base oils are the mineral lubricating oils having an SUS viscosity between about 100 and 5,000 SUS at 100° F. for the preparation of the finished lubricant whereas in the manufacture of lubricating oil concentrates the lube oils which are most suitable are the polyolefins of lubricating oil viscosity derived from the use of an excess of polyolefin in the manufacture of the alkenyl succinic anhydride reactant.

In regard to the azeotroping agents, any liquid agent is suitable which will form an azeotrope with water and readily distill from the reaction mixture under contemplated reaction temperatures. Specific examples of suitable azeotroping agents are the aromatic and alkylated aromatic liquid hydrocarbon such as toluene, benzene and xylene having a boiling point between about 80 and 200° C.

The following examples further illustrate the invention but are not to be construed as limitations thereof.

EXAMPLE I

This example illustrates the preparation of one of the additive concentrates of the invention.

To a 2 liter glass flask fitted with a reflux condenser, gas inlet and outlet tube, thermometer and stirrer, there was charged 494 grams (0.2 mole) of a polyisobutene (1100 M.W.) solution containing polyisobutene (1100 M.W.) succinic anhydride, 37 g. (0.2 mole) N-beta-hydroxyethyl-4-(3-hydroxypropyl) piperidine and 400 mls. of xylene. The reaction mixture was heated to reflux (~150° C.) and refluxed for a period of 16 hours. It was then heated to 200° C. and xylene was stripped off, then placed under a vacuum (~10 mm. Hg) for ½ hour, whereupon 437 grams of a paraffinic lubricating oil of an SUS viscosity of about 100 at 100° F. was added and the resultant mixture was stirred for 10 minutes and filtered through diatomaceous earth. The resultant lubricating oil concentrate was found to contain 0.30 wt. percent nitrogen (0.29 wt. percent calc.) and a total acid number of 2.9 (0 calc.). It was further analyzed by infrared spectra and determined to be a lubricating oil containing 30 wt. percent of a polymerized additive of polyisobutene succinic anhydride and N-beta-hydroxyethyl-4-(3-hydroxypropyl) piperidine and characterized by the formula:

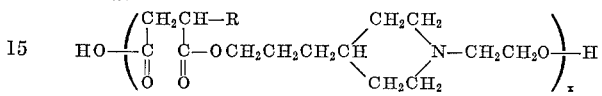

where R is polyisobutene radical of a molecular weight of about 1100 and $x$ is an average integer of ~5.

EXAMPLE II

This example again illustrates the preparation of the concentrate of the invention.

To a 2-liter flask of the type described in Example I, there was charged 212 grams of a polyisobutene (1100 M.W.) solution containing 120 grams (0.10 mole) of polyisobutene (1100 M.W.) succinic anhydride, 29.8 grams 1,3 - bis N - beta - hydroxyethyl - 4 - piperidyl) propane, 280 grams parffinic lubricating oil of an SUS viscosity of about 100 at 100° F. and 250 mls. of toluene. The reactants were heated to reflux (~125° C.) for a period of 3 hours and then heated to 190° C. to dryness simultaneously removing residual toluene with nitrogen blowing. The residue was filtered through diatomaceous earth and the filtrate weighed 451 grams. The filtrate was analyzed and found to contain 0.56 wt. percent nitrogen (0.58 calc.) and a total acid number of 0.96 (0 calc.). The filtrate was further analyzed by infrared analysis and was found to be a lubricating oil concentrate containing a polymerized additive of 29 wt. percent of polyisobutene succinic anhydride and 1,3 - bis(N-beta-hydroxyethyl - 4 - piperidyl) propane characterized by the formula:

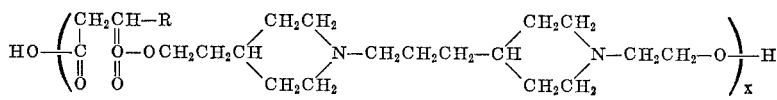

where R is a polyisobutene radical of about 1100 M.W. and $x$ is an average integer of ~5.

EXAMPLE III

This example further illustrates the preparation of the lubricating oil concentrate of the invention.

To a 1-liter flask of the type described in Example I, there was charged 212 grams of a polyisobutene (1100 M.W.) solution containing 120 grams (0.10 mole) of polyisobutene (1100 M.W.) succinic anhydride, 25.4 grams (0.10 mole) of 1 - (N - beta - hydroxyethyl-4-piperidyl) - 3 - (4 - piperidyl) propane, 236 grams of paraffinic mineral oil of an SUS viscosity of 100 at 100° F. and 250 mls. of toluene. The resultant mixture was refluxed (~125° C.) for 3 hours with continual removal of formed water as an azeotrope with toluene. The reaction mixture was then stripped at atmospheric pressure to 190° C. and filtered through diatomaceous earth. The filtrate weighed 425 grams and was analyzed and found to contain 0.55 wt. percent nitrogen (0.58 calc.) and a total acid number of 1.87 (0 calc.). The filtrate was further subjected to infrared analysis and determined to be a mineral lubricating oil concentrate containing 30 wt. percent of polymerized additive of polyisobutene succinic anhydride and 1 - (N - beta - hydroxyethyl-4-piperidyl) 3-(4-piperidyl) propane characterized by the formula:

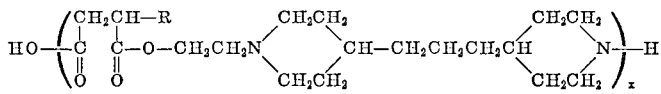

where R is polybutene of about 1100 M.W. and $x$ is an average integer of ~5.

EXAMPLE IV

This example further illustrates the additive concentrate of the invention.

To a 1-liter flask of the type described in Example I there was charged 250 grams of a polyisobutylene solution containing 136 grams (0.113 mole) of polyisobutene (1100 M.W.) succinic anhydride, 22.6 grams (0.112 mole) of 1,3-bis(4-piperidyl) propane and 350 mls. of xylene. The resultant mixture was refluxed to azeotrope off formed water (150° C.) for a period of 16 hours and then stripped under vacuum (~20 mm. Hg) to 200° C. to remove xylene. The resultant mixture was filtered through diatomaceous earth and the filtrate weighed 227 grams. The filtrate was analyzed and found to contain 1.2 wt. percent nitrogen (1.7 calc.). Calculations for average M.W. of active component in the concentrate indicate an average M.W. of about 7,500. The filtrate was further analyzed by infrared spectra and found to be a lubricating oil concentrate containing 58 wt. percent of a polymerized additive of polyisobutene succinic anhydride and 1,3 - bis(4 - piperidyl) propane characterized by the formula:

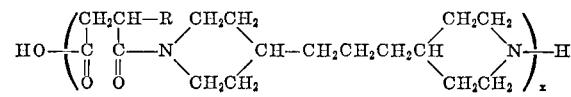

where R is a polyisobutene of a molecular weight of about 1100 and $x$ is an average integer of about ~5.

EXAMPLE V

This example illustrates the finished lubricant compositions of the invention, their dispersant properties and their unexpected superiority over comparative compositions.

Two laboratory bench sludge tests were employed to determine the relative dispersant effectiveness of the lubricating oil compositions. Test 1 consists of placing the lubricating oil compositions, a dispersion of resin coated titanium in naphthenic base oil (130 SUS at 100° F.) and cetane, in a weighed bottle. The weighed bottle is then capped and placed in a rocking device in an oven and rocked for 20 hours at 80° C. At the end of the 20 hour period 0.7 ml. of the bottle contents is immediately transferred to a centrifuge tube. The tube is then centrifuged and the depth of the resultant sediment in the bottom of the centrifuge tube is measured in millimeters. The greater the depth of sediment, the poorer the dispersant properties of the test lubricating oil composition.

Test 2 is somewhat of a more severe dispersancy test than Test 1. It is run in an identical manner except that as part of the test composition a standard amount of hydrocarbon blowby obtained from an internal combustion engine is added in conjunction with the ingredients tested for Test 1. Again, the greater the depth of sediment observed, the poorer the dispersant characteristics. The compositions tested are as follows:

(1) Composition A consists of a lube oil containing the polymeric additive concentrate of Example I.

(2) Composition B consists of a lube oil containing the additive concentrate of Example I except $x$ is 1.

(3) Composition C consists of a lube oil containing the polymeric additive concentrate of Example II.

(4) Composition D consists of a lube oil containing the additive concentrate of Example II except $x$ is 1.

(5) Composition E consists of a lubricating oil containing the polymeric additive concentrate of Example III.

(6) Composition F consists of a lubricating oil containing the concentrate of Example III except $x$ is 1.

(7) Composition G consists of a lubricating oil containing 1.1, 1.9 and 2.4 wt. percent of the polymeric additive concentrate of Example IV.

(8) Composition H consists of a lubricating oil containing the additive concentrate of Example IV except $x$ is 1.

(9) Composition I is a lubricating oil consisting of a hydrocarbon oil of an SUS viscosity of 127 at 100° F. containing 4 wt. percent of a polymeric additive lube oil concentrate of polyisobutene (1100 M.W.) succinic anhydride and tripropoxylated aminoethyl piperazine, characterized by the formula:

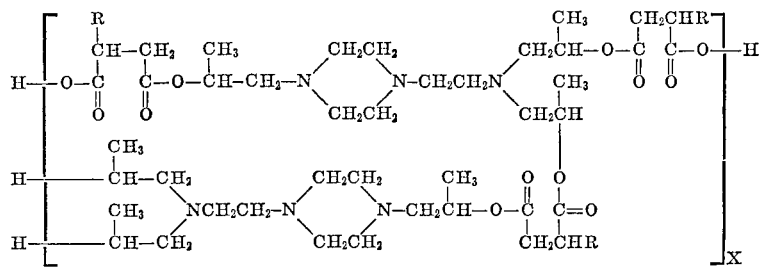

where R is a polyisobutene radical of a molecular weight of about 1100 and $x$ is an average integer of about 5.

(10) Composition J consists of a hydrocarbon lubricating oil of an SUS viscosity of 127 at 100° F. containing 4 wt. percent of a lube oil concentrate containing 75 wt. percent of a paraffinic lubricating oil having an SUS viscosity of 100 at 100° F. and 25 wt. percent of a polyisobutene (1100 M.W.) succinamic derivative of tetraethylenepentamine characterized by the formula:

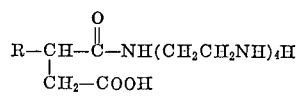

where R is polyisobutene radical of about 1100 M.W.

(11) Composition K consists of a hydrocarbon lubricating oil containing 4 wt. percent of a lube oil concentrate of an ethylene oxide derivative of an inorganic phosphorus acid free, steam hydrolyzed polyisobutene (1100 M.W.)-$P_2S_5$ reaction product wherein the mole ratio of ethylene oxide to reaction product is about 1:1 in the concentrate and has a phosphorus content of 1.0 wt. percent and a sulfur content of 0.7 wt. percent.

The test data and results are reported below in Table I:

TABLE I

| Composition | Wt. percent nitrogen in test oil | Bench sludge tests, sediment depth, mm. | |
|---|---|---|---|
| | | 1 | 2 |
| A | .006 | 0.5 | 2.9 |
| A | .012 | 0.5 | 1.4 |
| A | .018 | 0.4 | 1.1 |
| B [1] | .006 | 2.3 | 3.5 |
| B [1] | .012 | 0.5 | 3.2 |
| B [1] | .018 | 0.4 | 2.2 |
| C | .022 | 0.6 | 2.0 |
| D [1] | .022 | 1.1 | 3.2 |
| E | .022 | 1.1 | 2.1 |
| F [1] | .022 | 3.2 | 3.8 |
| G | .014 | 0.6 | 4.0 |
| G | .022 | 0.4 | 3.8 |
| G | .028 | 0.3 | 3.8 |
| H [1] | .014 | 0.7 | 4.1 |
| H [1] | .022 | 0.7 | 4.1 |
| H [1] | .028 | 0.6 | 4.5 |
| I [1] | 0.022 | 0.4 | 1.4 |
| J [1] | 0.06 | 0.4 | 1.5 |
| K [1] | [2] 0.04 | 0.4 | 2.7 |

[1] Comparative compositions.
[2] Phosphorus.

As can be seen from the foregoing on an equivalent weight basis the lubricant compositions of the invention are substantially more effective dispersants than their non-polymeric counterpart and other related compositions.

I claim:

1. A hydrocarbon lubricating oil containing between about 1 and 80 wt. percent of a polymeric alkenyl succinic anhydride piperidine dispersant of the formula:

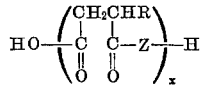

where Z is a member selected from the group consisting of:

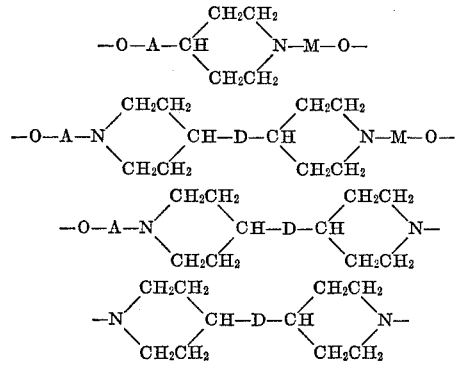

and where $x$ is an average integer of between about 2 and 100, R is a monovalent alkenyl hydrocarbon radical of from 30 to 200 carbons and A, M and D are divalent saturated aliphatic hydrocarbons of from 2 to 10 carbons.

2. A composition in accordance with claim 1 wherein R is a polyisobutene of an average molecular weight of about 1100.

3. A composition in accordance with claim 2 wherein Z is:

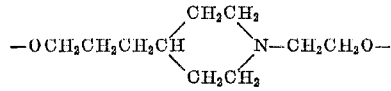

and $x$ is about 5.

4. A composition in accordance with claim 2 wherein Z is:

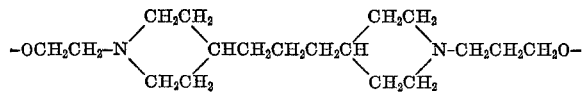

and $x$ is about 5.

5. A composition in accordance with claim 2 wherein Z is:

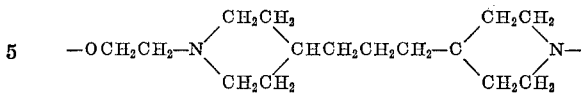

and $x$ is about 5.

6. A composition in accordance with claim 2 wherein Z is:

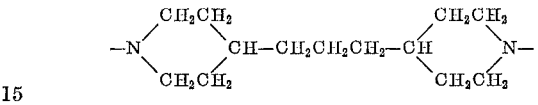

and $x$ is about 5.

7. A composition in accordance with claim 1 wherein said dispersant is prepared by contacting under substantially anhydrous conditions an alkenyl succinic anhydride of the formula:

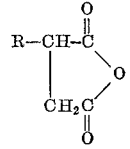

where R is as defined with a piperidine derivative selected from the group consisting of N-beta-hydroxyethyl-4-(3-hydroxypropyl)piperidine, 1,3-bis(N-beta-hydroxyethyl - 4-piperidyl)propane, 1-(N-beta-hydroxyethyl-4 - piperidyl)-3-(4-piperidyl)propane and 1,3-bis(4-piperidyl)propane in a ratio of anhydride to piperidine derivative of between about 0.8:1.0 and 1.0:0.8 at a temperature between about 80° and 220° C. under conditions where water is continuously removed from the reaction mixture as formed.

8. A composition in accordance with claim 8 wherein said contacting is conducted in the presence of a hydrocarbon lubricating oil, the reaction mixture initially including liquid azeotroping agents for water.

9. A composition in accordance with claim 7 wherein said reaction mixture is continuously stripped during said contacting with inert gas and following said contacting said temperature is adjusted to between about 160° and 220° C. thereby removing any residual water and volatile material.

10. A composition in accordance with claim 7 wherein said R is polyisobutylene radical of a molecular weight of about 1100.

11. A composition in accordance with claim 10 wherein said piperidine derivative is N-beta-hydroxyethyl-4-(3-hydroxypropyl)piperidine.

12. A composition in acccordance with claim 10 wherein said piperidine is 1,3-bis(N-beta-hydroxyethyl-4-piperidyl)propane.

13. A composition in accordance with claim 10 wherein said piperidine is 1-(N-beta-hydroxyethyl-4-piperidyl)-3-(4-piperidyl)propane.

14. A composition in accordance with claim 8 wherein said piperidine derivative is 1,3-bis(4-piperidyl)propane.

References Cited

UNITED STATES PATENTS 3,424,684   1/1969   Hellmuth _____ 252—51.5 A

DANIEL E. WYMAN, Primary Examiner

W. J. SHINE, Assistant Examiner

U.S. Cl. X.R.

260—294 S